(12) United States Patent
Yang et al.

(10) Patent No.: US 12,525,917 B2
(45) Date of Patent: Jan. 13, 2026

(54) PHOTOVOLTAIC SYSTEM AND METHOD FOR DETERMINING COMBINER BOX SET FOR THE SAME

(71) Applicant: Sungrow Renewables Development Co., Ltd., Hefei (CN)

(72) Inventors: Zongjun Yang, Hefei (CN); Sanqi Tao, Hefei (CN); Fan Li, Hefei (CN)

(73) Assignee: Sungrow Renewables Development Co., Ltd., Hefei (CN)

( * ) Notice: Subject to any disclaimer, the term of this patent is extended or adjusted under 35 U.S.C. 154(b) by 0 days.

(21) Appl. No.: 18/326,264

(22) Filed: May 31, 2023

(65) Prior Publication Data

US 2023/0402966 A1 Dec. 14, 2023

(30) Foreign Application Priority Data

Jun. 8, 2022 (CN) .......................... 202210639279.2

(51) Int. Cl.
*H02S 40/34* (2014.01)

(52) U.S. Cl.
CPC .................................... *H02S 40/34* (2014.12)

(58) Field of Classification Search
CPC ....................................................... H02S 40/34
See application file for complete search history.

(56) References Cited

U.S. PATENT DOCUMENTS

| 2011/0031814 | A1 | 2/2011 | Giesler |
| 2011/0209741 | A1 | 9/2011 | Solon |
| 2021/0135455 | A1* | 5/2021 | Marinopoulos ......... H02S 40/32 |
| 2022/0158443 | A1* | 5/2022 | Zhang ................... H02M 3/158 |

FOREIGN PATENT DOCUMENTS

| JP | 2014-107370 A | 6/2014 |
| JP | 2019-036812 A | 3/2019 |

OTHER PUBLICATIONS

IPD, "Find out why you would install a DC Combiner Box into your next solar energy project", Jan. 28, 2022, [online], [retrieved on Apr. 15, 2024]. Retrieved from the Internet:<URL: https://www.ipd.com.au/find-out-why-you-would-install-a-dc-combiner-box-intoyour-next-solar-energy-project> (Year: 2022).*
First Examination Report for Australian Patent Application No. 2023202970, dated Mar. 15, 2024.

* cited by examiner

*Primary Examiner* — Tae-Sik Kang
(74) *Attorney, Agent, or Firm* — Wolf, Greenfield & Sacks, P.C.

(57) ABSTRACT

A photovoltaic system and a method for determining a combiner box set for the photovoltaic system are provided. The photovoltaic system includes a photovoltaic array divided into at least two combination groups, a photovoltaic converter, and a combiner box in at least one nonfinal stage and a combiner box in a final stage for each of the at least two combination groups. A direct current side of the photovoltaic converter is electrically connected to an output terminal of the combiner box in the final stage. The combiner box in the final stage and the combiner box in the at least one nonfinal stage are configured to combine outputs of photovoltaic strings in the combination group. Each combiner box combines multiple cables into a single cable.

14 Claims, 13 Drawing Sheets

_US 12,525,917 B2_

PHOTOVOLTAIC SYSTEM AND METHOD FOR DETERMINING COMBINER BOX SET FOR THE SAME

The present disclosure claims priority to Chinese Patent Application No. 202210639279.2, titled "PHOTOVOLTAIC SYSTEM AND METHOD FOR DETERMINING COMBINER BOX SET FOR THE SAME", filed on Jun. 8, 2022, with the China National Intellectual Property Administration, which is incorporated herein by reference in its entirety.

FIELD

The present disclosure relates to the field of photovoltaic technologies, and in particular to a photovoltaic system and a method for determining a combiner box set for the photovoltaic system.

BACKGROUND

As shown in FIG. 1, all the photovoltaic strings 01 arranged in a relatively flat centralized photovoltaic power station are divided into multiple combination groups 02. Here, all the photovoltaic strings 01 in the same combination group 02, after being combined together through the combiner box 03, are connected to a direct current side of a photovoltaic converter 04 and thence to a power grid 05. Currently, the combiner box 03 typically has 16 inputs and 1 output, i.e., the input side of the combiner box 03 is connected to 16 photovoltaic strings 01 at the maximum. Alternatively, the combiner box 03 currently has 24 inputs and 1 output, i.e., the input side of the combiner box 03 is connected to 24 photovoltaic strings 01 at the maximum, as shown in FIG. 2.

Since the combination group 02 physically occupies a large area, and there are two direct current cables, namely, positive and negative cables, connecting each photovoltaic string 01 and the combiner box 03, i.e., a length of the direct current cables connecting each photovoltaic string 01 and the combiner box 03 is twice a physical distance between the photovoltaic string 01 and the combiner box 03, and therefore is relatively large. As a result, demand of one combination group 02 for the direct current cable is relatively large, resulting in high costs for combination of one combination group 02. According to statistics, the total cost of cables accounts for 5% of the total cost of the entire photovoltaic system, and the total cost of direct current cables for all the combination groups 02 accounts for 35% of the total cost of cables in the entire photovoltaic system.

Therefore, it is imperative to reduce the cost of direct current cables for the combination group.

SUMMARY

In view of this, a photovoltaic system and a method for determining a combiner box set for the photovoltaic system are provided according to the present disclosure, so as to reduce the cost of direct current cables spent on the combination groups.

The photovoltaic system according to the present disclosure includes: a photovoltaic array divided into at least two combination groups, a photovoltaic converter, and a combiner box in at least one nonfinal stage and a combiner box in a final stage for each of the at least two combination groups. A direct current side of the photovoltaic converter is electrically connected to an output terminal of the combiner box in the final stage. The combiner box in the final stage and the combiner box in the at least one nonfinal stage are configured to combine outputs of photovoltaic strings in the combination group. It can be seen that each combiner box combines multiple cables into a single cable. That is, photovoltaic strings are connected to the combiner box though a single cable largely instead of respective cables. Therefore, the total length of cables for combining outputs of all the photovoltaic strings in the combination group together is significantly reduced in comparison with the conventional technology, and therefore the costs of the cables are reduced. In addition, in comparison with the conventional technology, the cable out from the combiner box is larger in cross section, so that the line loss is reduced and the amount of generated power is increased. Further, fewer cables facilitate on-site construction.

In addition, the photovoltaic array is divided into at least two combination groups. The photovoltaic strings in each combination group are combined to the combiner box in the final stage through combiner boxes in at least one nonfinal stage, so that the performance in positioning failures during operation can be improved. Unlike the conventional technology in which the electrical connection of the combiner box in the final stage is cut off in case of failures, the electrical connection of only an individual nonfinal stage is cut off in case of failures. That is, it is unnecessary to cut off the electrical connection of the final stage according to the present disclosure, thereby greatly reducing negative impact caused by the failures, improving the stability of the power generation system, and reducing the loss of power generation.

BRIEF DESCRIPTION OF THE DRAWINGS

In order to more clearly illustrate the technical solutions in the embodiments of the present disclosure or in the conventional technology, the drawings used in the description of the embodiments or the conventional technology are briefly introduced hereinafter. It is apparent that the drawings in the following description illustrate merely embodiments of the present disclosure. Other drawings may be obtained by those skilled in the art without creative efforts based on the provided drawings.

DETAILED DESCRIPTION OF EMBODIMENTS

Figure 1:
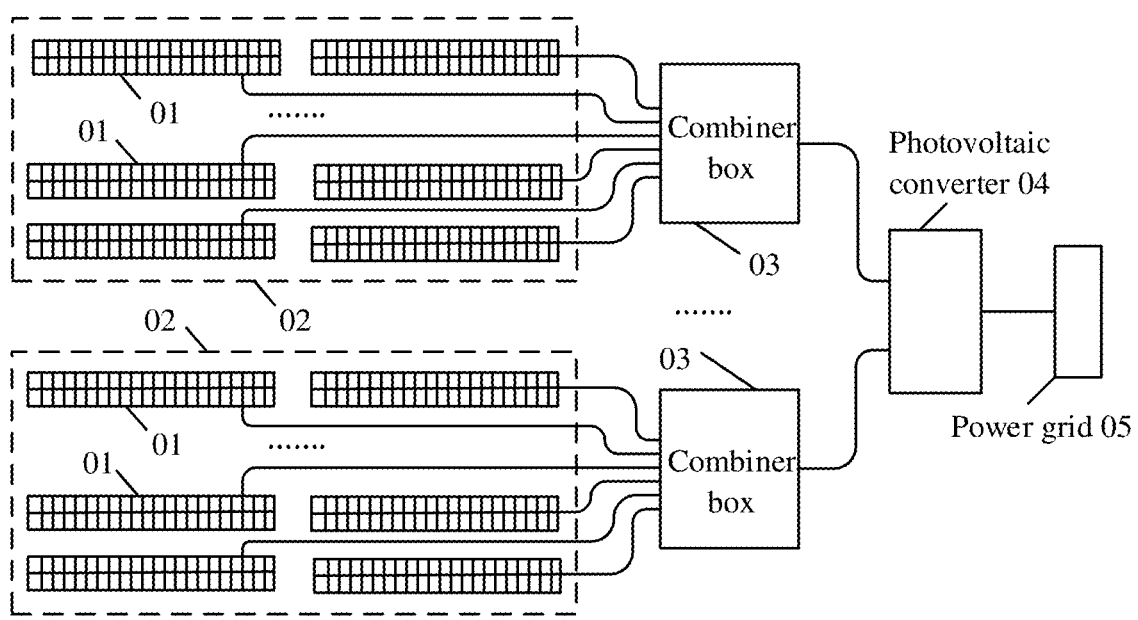
FIG. 1 and FIG. 2 each are a schematic structural diagram illustrating a photovoltaic system according to the conventional technology.

The technical solutions in the embodiments of the present disclosure will be described clearly and completely hereinafter in combination with the drawings in the embodiments of the present disclosure. It is apparent that the described embodiments are merely a part rather than all of the embodiments of the present disclosure. Based on the embodiments of the present disclosure, all other embodiments obtained by those skilled in the art without creative efforts should fall within the protection scope of the present disclosure.

In the present disclosure, relational terms such as first, second and the like are for distinguishing one entity or operation from another rather than necessitating or implying any actual relationship or order between these entities or operations. Furthermore, the terms "comprising/comprise(s)", "including/include(s)", or any other variant thereof are intended to be non-exclusive such that a process, method, article, or device that includes a series of elements include not only those elements but also other elements that are not explicitly listed or other elements that are inherent to such process, method, article, or device. Without further limitation, an element limited by the phrase "comprise(s)/comprising/include(s)/including/a(n) . . . " does not exclude the existence of other identical elements in the process, method, article or device including that element.

In order to reduce the cost of the direct current cables for the combination group, a photovoltaic system is provided according to embodiment of the present disclosure. Details about the photovoltaic system refer to FIG. 3 (which only illustrates a combiner box 10 in a first stage, a combiner box 20 in a second stage, and each combination group 02 including 16 photovoltaic strings 01). The photovoltaic system includes: a photovoltaic array, a photovoltaic converter 04 and a multistage combiner including at least a nonfinal stage and a final stage.

The photovoltaic array is divided into at least two combination groups 02, depending on practical application scenarios.

In an embodiment, the photovoltaic converter includes a photovoltaic inverter only. In another embodiment, the photovoltaic converter includes a photovoltaic inverter and a direct current (DC/DC) converter, depending on practical application scenarios.

In practice, details about a multistage combiner box depend on practical application scenarios, and thus are not limited herein.

In an embodiment, the combiner box is an ordinary combiner box, i.e., capable of only combining outputs of several photovoltaic strings together. In another embodiment, the combiner box is an intelligent combiner box, i.e., capable of monitoring photovoltaic strings in addition to combining outputs of several photovoltaic strings together. In another embodiment, the combiner box is a maximum power point tracking (MPPT) combiner box, i.e., capable of MPPT tracking in addition to combining outputs of several photovoltaic strings together.

The photovoltaic system is described in detail below.

A direct current side of the photovoltaic converter 04 is electrically connected to an output terminal of at least one combiner box in a final stage. The combiner box in the final stage, together with a combiner box in at least one stage different from the final stage, combine outputs of photovoltaic strings 01 in the corresponding combination group 02.

The solution that the combiner box in the final stage combines outputs of the photovoltaic strings 01 in the corresponding photovoltaic strings 01 together with the combiner box in at least one stage is described in detail in combination with the following first and second embodiments.

Figure 3:
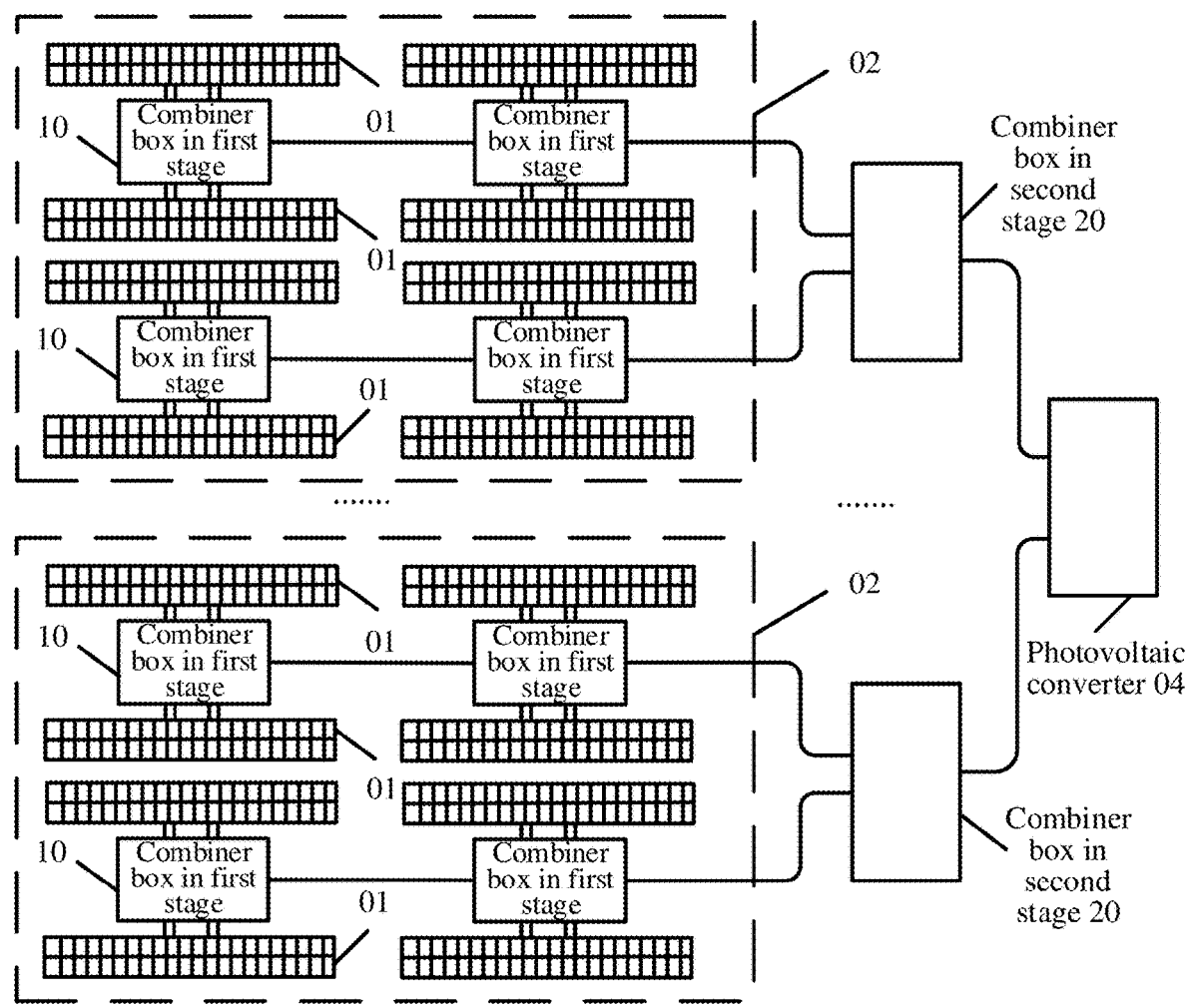
FIG. 3 is a schematic structural diagram illustrating a photovoltaic system according to an embodiment of the present disclosure.
Figure 4:
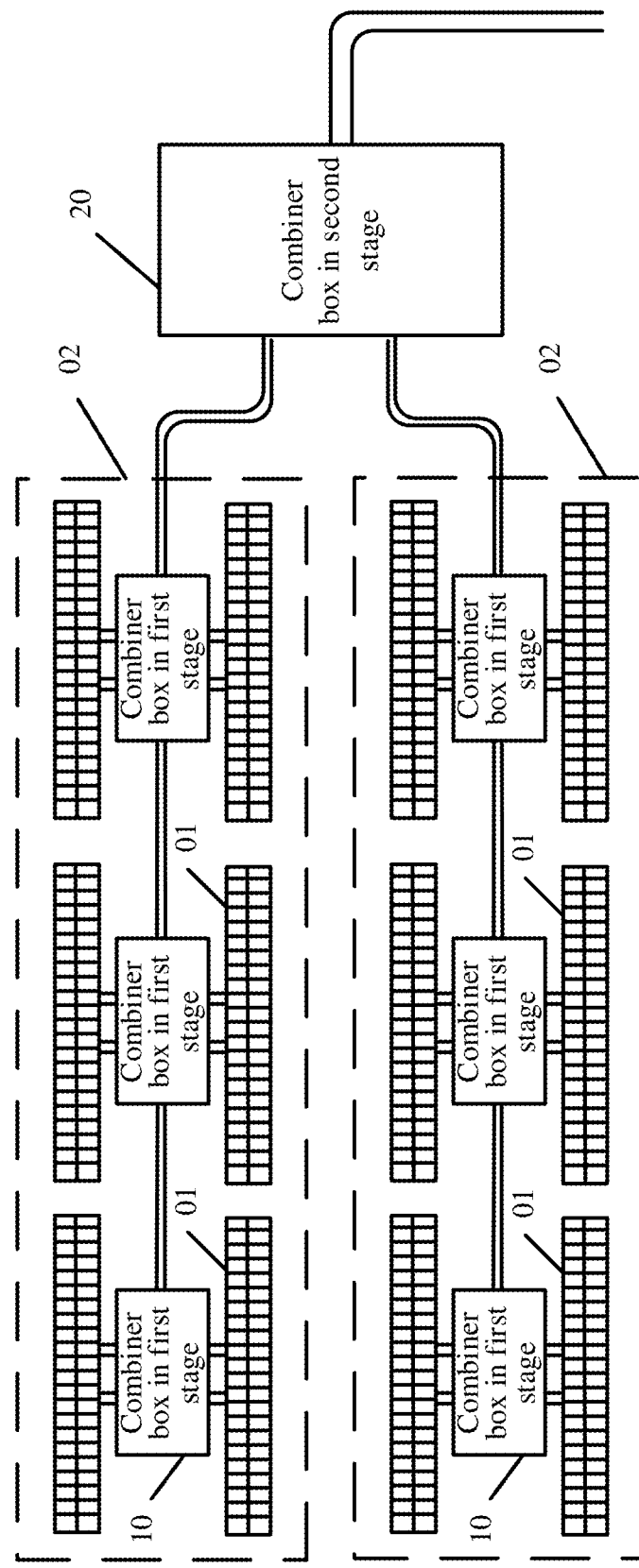
FIGS. 4 to 9 each are a schematic structural diagram illustrating the photovoltaic system according to an embodiment of the present disclosure.

FIGS. 3 and 4 illustrate the first embodiment. The combiner box in the final stage and the combiner box in at least one stage that combine outputs of the photovoltaic strings 01 in the same combination group 02 form a combiner box set. In this combiner box set, an input terminal of a combiner box in a first stage is connected to at least two photovoltaic strings 01 in the combination group 02, and an input terminal of a combiner box in a next stage is connected to output terminals of at least two combiner boxes in a stage immediately before the next stage (here a combiner box in one stage is connected to a combiner box in a next stage via a common electrical bus, which is described in detail below). An output terminal of the combiner box in the final stage is electrically connected to the direct current side of the photovoltaic converter 04.

Figure 5:
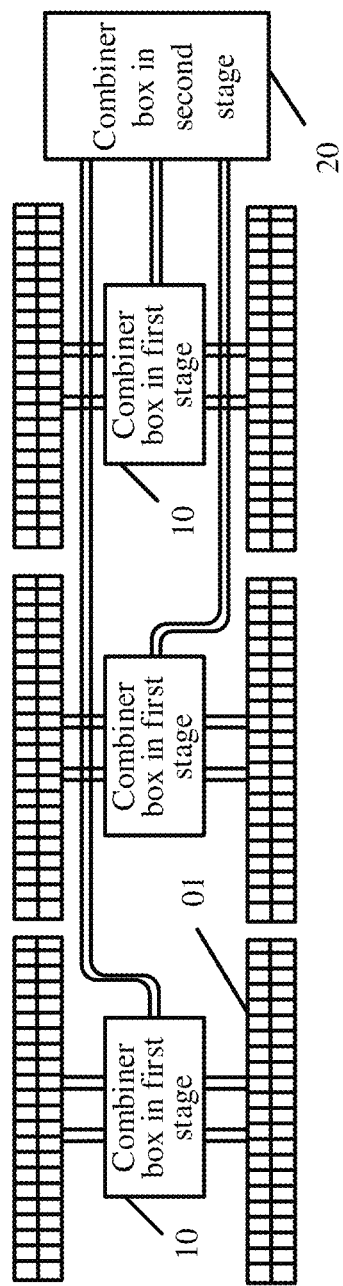

FIG. 5 illustrates the second embodiment. The combiner box in the final stage and the combiner box in at least one stage by which outputs of the photovoltaic strings 01 in the same combination group 02 are combined together form a combiner box set. In this combiner box set, an input terminal of a combiner box in a first stage is connected to at least two photovoltaic strings 01 in the combination group 02, and an input terminal of a combiner box in a next stage is connected to at least one photovoltaic string 01 and an output terminal of at least one combiner box in a stage immediately before the next stage. An output terminal of the combiner stage in the final stage is electrically connected to the direct current side of the photovoltaic converter 04.

The above first and second embodiments illustrate the solution to the combination of the photovoltaic strings 01 in the combination group 02. However, the solution to the combination of the photovoltaic strings 01 in the combination group 02 depends on practical application scenarios, and thus is not limited thereto.

It can be seen that each combiner box combines multiple cables into a single cable. That is, photovoltaic strings 01 are connected to the combiner box (directly connected to the direct current side of the photovoltaic converter 04) though a single cable largely instead of respective cables. Therefore, the total length of cables for combining outputs of all the photovoltaic strings 01 in the combination group 02 together is significantly reduced in comparison with the conventional technology, and therefore the costs of the cables are reduced. In addition, in comparison with the conventional technology, the cable out from the combiner box is larger in cross section, so that the line loss is reduced and the amount of generated power is increased. Further, fewer cables facilitate on-site construction.

In addition, the photovoltaic array is divided into at least two combination groups, and each combination group is connected to the combiner box (directly connected to the direct current side of the photovoltaic converter 04) via combiner boxes in at least one stage, thereby improving the positioning of failures during operation. Unlike the conventional technology in which the electrical connection of the combiner box in the final stage (directly connected to the direct current side of the photovoltaic converter 04) is cut off in case of failures, the electrical connection of only an individual nonfinal stage is cut off in case of failures. That is, it is unnecessary to cut off the electrical connection of the final stage, thereby greatly reducing negative impact caused by the failures, improving the stability of the power generation system, and reducing the loss of power generation.

The combiner box in the conventional technology is arranged at a center of the combination group 02 in order to reduce the cost of the direct current cables for combining outputs of all the photovoltaic strings 01 in the combination group 02 together. In most scenarios due to road restrictions, however, the combiner box has to be arranged at the side of a road in order to facilitate operation and maintenance.

Therefore, it is difficult to arrange the combiner box at the center of the combination group 02.

It should be noted that, with the photovoltaic system according to the present disclosure, the total length of cables for combining outputs of all the photovoltaic strings 01 in the combination group 02 together can be significantly reduced regardless of whether the combiner box is arranged at the side of the road. Therefore, the total costs of the cables for combining outputs of all the photovoltaic strings 01 in the combination group 02 together are reduced, thereby reducing costs of the cables for the entire photovoltaic system.

Preferably, the combiner box is arranged on a supporting member of a photovoltaic string closest to a geometric center of an input end position image. The input end position image is a geometric image formed by respective positions of devices electrically connected to an input end of the combiner box. The devices include photovoltaic strings in the combination group. Alternatively, the devices include photovoltaic strings in the combination group and a combiner box in a different stage.

For example, the combiner box is to be electrically connected to multiple photovoltaic strings 01. A geometric center of a geometric image formed by positions of these photovoltaic strings 01 is found, and then the combiner box is arranged on the supporting member of the photovoltaic string 01 closest to the geometric center.

It should be noted that, a combiner box arranged in this manner is closer to a combiner box in a former stage or each photovoltaic string 01, so that the direct current cable between the two combiner boxes is short and the direct current cable between the combiner box and the photovoltaic string 01 is short. Therefore, the total costs of the cables for combining outputs of all the photovoltaic strings 01 in the combination group 02 together are further reduced, thereby further reducing costs of the cables for the entire photovoltaic system.

Only a preferred arrangement of the combiner box is described above. In practice, the combiner box may be arranged in other manners. For example, the combiner box is arranged on a supporting member of a photovoltaic string at the edge of the combination group 02. The arrangement of the combiner box depends on practical application scenarios, e.g., presence or absence of road restrictions, and thus is not limited hereto.

In an embodiment, the direct current cable between the combiner boxes and the direct current cable between the photovoltaic string 01 and the combiner box are made of aluminum, copper or the like, depending on practical application scenarios.

It should be noted that since aluminum is cheaper than copper, the total costs of cables made of aluminum instead of copper for the combination group 02 can be further reduced. Therefore, the cable is made of aluminum preferably if necessary.

The technical solution of the present disclosure is compared with the conventional solution below by an example in which the combination group 02 includes 24 photovoltaic strings 01.

Figure 2:
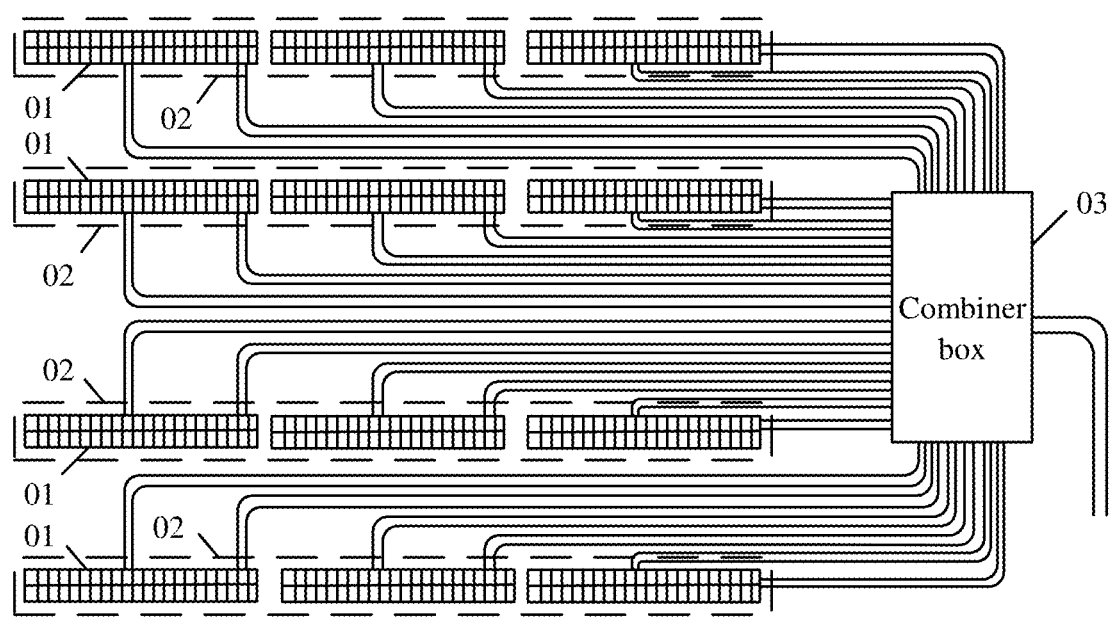

The first conventional solution is described in detail in the BACKGROUND with referring to FIG. 2, and thus is not repeated here.

The second conventional solution is substantially similar to the first conventional solution except that the direct current cable in the second conventional solution is made of aluminum rather than copper.

The technical solution of the present disclosure is as follows. Reference is made to FIG. 4 (illustrating one combination group 02 and combiner boxes in different stages being connected through a common electrical bus). The outputs of photovoltaic strings 01 in the combination group 02 are combined by combiner boxes in two stages, i.e., 6 combiner boxes in a first stage and one combiner box 10 in a second stage. For each of the 6 combiner boxes in the first stage, four input terminals of the combiner box 10 are electrically connected to four photovoltaic strings 01 respectively, and an output terminal of the combiner box 10 is electrically connected to the combiner box 20 in the second stage.

If output power of one photovoltaic string 01 is 15 KW, and then the total of 24 photovoltaic strings 01 is 340 KW. Costs of the direct current cables for the combination group 02 corresponding to the three solutions are shown in the table below.

| Solutions | Capacity (KW) | Number of combiner box | Number of PV strings | Length of DC cables in total (m) | Reduction in costs of DC cables (%) |
|---|---|---|---|---|---|
| First conventional solution | 360 | 1 | 24 | 2010 | — |
| Second conventional solution | 360 | 1 | 24 | 2010 | −30 |
| Technical solution of the present disclosure | 360 | 6 + 1 | 24 | 430 | ≈−78 |

On the basis of FIG. 3, details about the connection between the output terminal of the combiner box and an input terminal of a combiner box in a next stage are provided below according to a first embodiment of the present disclosure, as shown in FIG. 5 (which illustrates a combination group 02, combiner boxes 10 in the first stage, and a combiner box 20 in the second stage). Details about the connection between the output terminal of the combiner box in the final stage and the direct current side of the photovoltaic converter 04 are provided below according to a second embodiment of the present disclosure.

In the first embodiment, output terminals of the combiner boxes 10 are electrically connected to input terminals of the combiner box 20 in the next stage through buses, respectively, as shown in FIG. 5. In the second embodiment, output terminals of combiner boxes in the final stage are electrically connected to the direct current side of the photovoltaic converter 04 through respective buses (which is the same as the first embodiment and not shown in the drawings).

Figure 6:
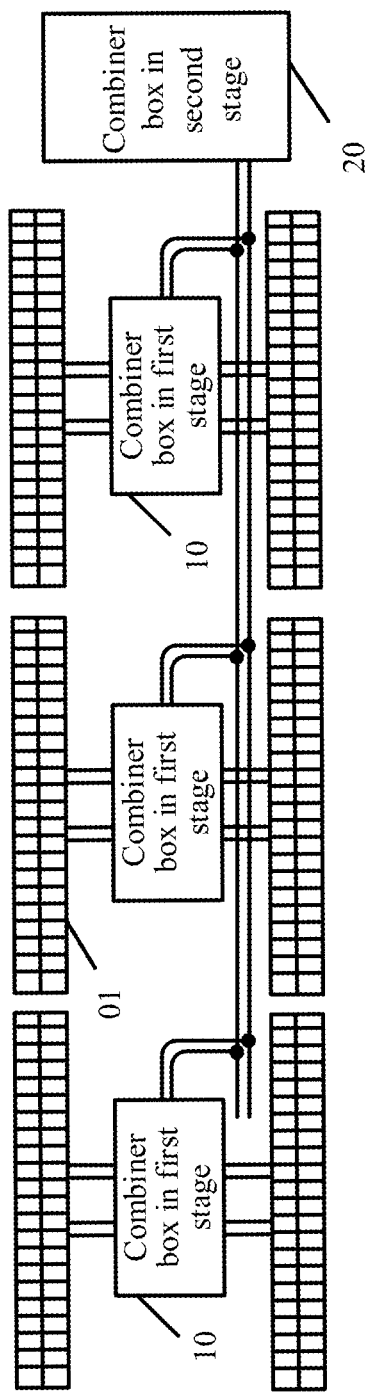

On the basis of FIG. 3, details about the connection between the output terminal of the combiner box and an input terminal of a combiner box in a next stage are provided below according to a third embodiment of the present disclosure, as shown in FIG. 6 (which illustrates a combination group 02, combiner boxes 10 in the first stage, and a combiner box 20 in the second stage). Details about the connection between the output terminal of the combiner box in the final stage and the direct current side of the photovoltaic converter 04 are provided below according to a fourth embodiment of the present disclosure.

In the third embodiment, output terminals of at least two combiner boxes in the same stage are electrically connected to the same input terminal of the combiner box in the next stage through a common electrical bus, as shown in FIG. 6. In the fourth embodiment, output terminals of at least two combiner boxes in the final stage are electrically connected to the photovoltaic converter 04 through a common electrical bus.

Figure 7:
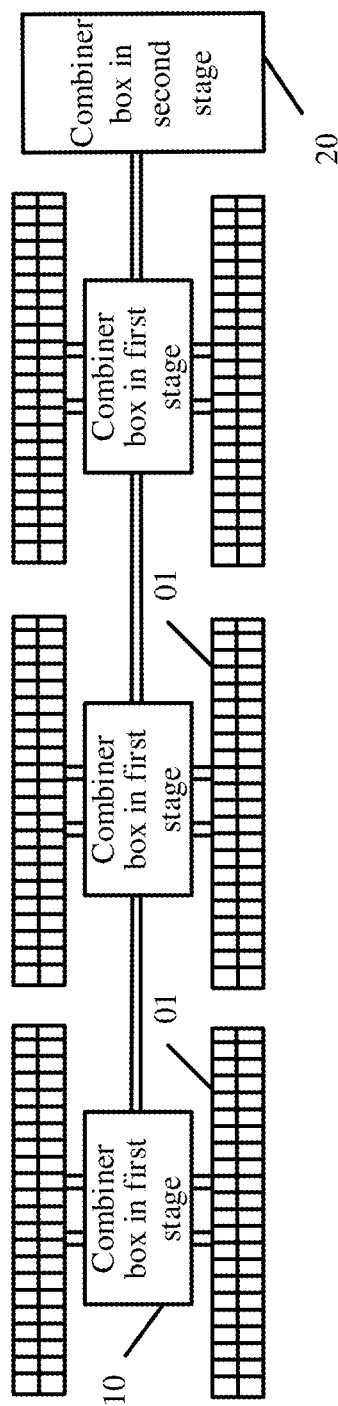

In an embodiment, the combiner box is externally connected to the common electrical bus, as shown in FIG. 6. In another embodiment, the combiner box is internally connected to the common electrical bus, as shown in FIG. 7 (which illustrates a combination group 02, combiner boxes 10 in the first stage, and a combiner box 20 in the second stage). Whether the combiner box is internally or externally connected to the common electrical bus depends on practical application scenarios, and thus is not limited herein.

It should be noted that insulation between the common electrical bus and the combiner box is indispensable for the case that the combiner box is externally connected to the common electrical bus, resulting in high degree of difficulty. However, this kind of insulation is unnecessary for the case that the combiner box is internally connected to the common electrical bus. In view of this, the combiner box is internally connected to the common electrical bus preferably.

In practice, a current flowing through the common electrical bus increases along a direction in which the power is transferred. That is, the current flowing through the common electrical bus increases from the combiner box in the first stage to the combiner box in the final stage or the photovoltaic converter 04. Details about the common electrical bus are provided according to the following first to third embodiments for the sake of electrical safety of the common electrical bus.

In the first embodiment, the common electrical bus has an equal cross-section throughout its length, and a size of the cross-section depends on a maximum current flowing through the common electrical bus.

Figure 8:
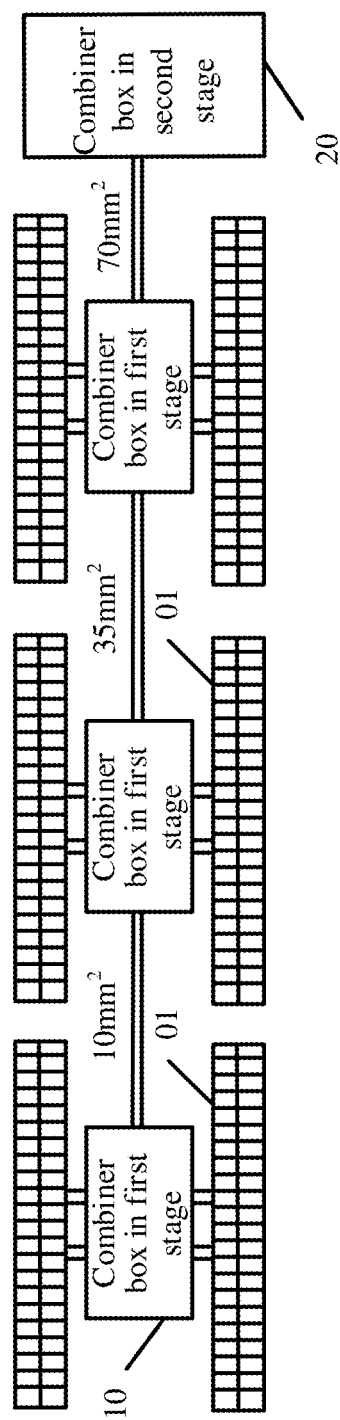

In the second embodiment, the common electrical bus has a stepwise variable cross-section. That is, the common electrical bus is divided into segments according to current, and a size of the cross-section of each segment depends on a current flowing through the segment, as shown in FIG. 8 (which illustrates a combination group 02, combiner boxes 10 in the first stage, and a combiner box 20 in the second stage).

In the third embodiment, the common electrical bus has a variable cross-section. That is, the common electrical bus is divided into segments according to current, and a size of the cross-section of each segment depends on a maximum current flowing through the segment.

It should be noted that although simple for implementation, the common electrical bus in the first embodiment incurs high costs since its cross-section matches the maximum current throughout. In addition, due to most part of the common electrical bus through which only relatively small current instead of the maximum current flows, so that the common electrical bus fails to be fully used, resulting in waste. Although the common electrical bus in the second embodiment can be fully used, the stepwise variable cross-section ineluctably brings high difficulties with implementation, resulting in high costs. The common electrical bus in the third embodiment balances the full use of the common electrical bus and the difficulties with implementation.

Some details about the common electrical bus are described in the above first to third embodiments. In practice, the common electrical bus depends on practical application scenarios, and thus is not limited herein.

Figure 9:
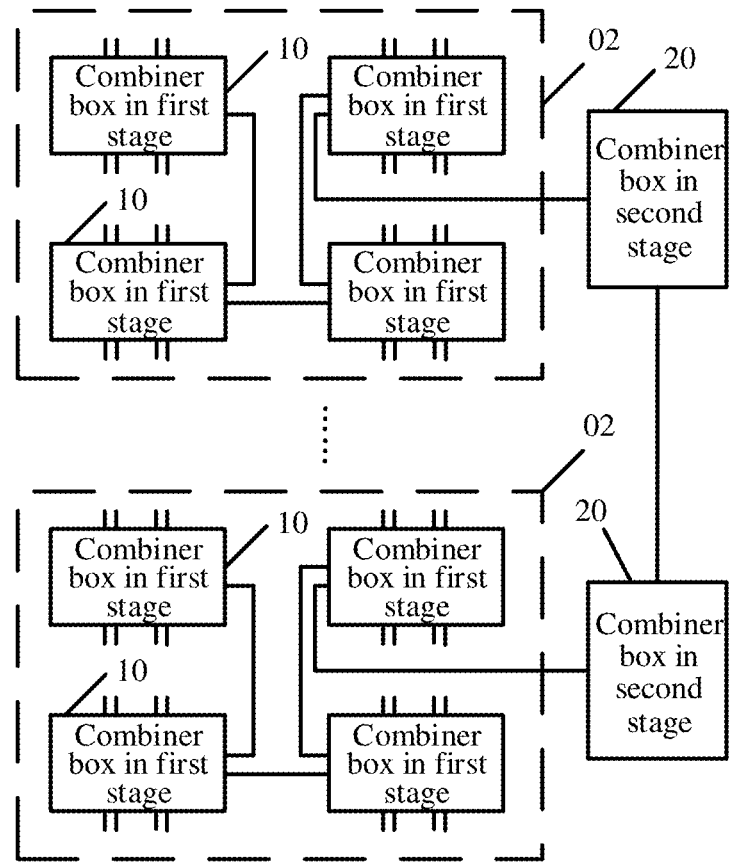

On the basis of FIG. 3, communications between combiner boxes in different stages and communications between the combiner box and the photovoltaic converter 04 are provided according to another embodiment of the present disclosure. Reference here is made to FIG. 9 (which illustrates communications between the combiner box 10 in the first stage and the combiner box 20 in the second stage, and does not shown the photovoltaic converter 04 for simplified view).

A combiner box is communicatively connected to a combiner box in a next stage electrically connected to its output terminal. Further, a combiner box in the final stage is communicatively connected to the photovoltaic converter 04 electrically connected to an output terminal of the combiner box. That is, combiner boxes in two successive stages are communicated in a master/slave mode, or the combiner box in the final stage and the photovoltaic converter 04 are communicated in a master/slave mode.

In an embodiment, at least two combiner boxes communicatively connected to the same combiner box in the next stage are communicatively connected to each other through a common communication bus. In another embodiment, at least two combiner boxes in the final stage communicatively connected to the photovoltaic converter 04 are communicatively connected to each other through a common communication bus. In practice, the present disclosure is not limited thereto. For example, combiner boxes are communicatively connected to the same combiner box in the next stage through respective communication buses, or combiner boxes in the final stage communicatively connected to the photovoltaic converter 04 through respective communication buses, depending on practical application scenarios.

The photovoltaic system in this embodiment of the present disclosure is basically the same as the photovoltaic system in the above embodiments except here the combiner box in the final stage is a main combiner box and the combiner box in the nonfinal stage is a sub-combiner box.

In another embodiment, each of the combiner box in the final stage and the combiner box in the penultimate stage is a main combiner box, and the combiner box in other stage in a sub-combiner box. Details about the combiner box in each stage depends on practical application scenarios and thus are not limited herein.

Each of the main combiner box and the sub-combiner box is the existing combiner box. For example, the main combiner box is as shown in FIG. 10, and the sub-combiner box is a as shown in FIG. 11.

Figure 10:
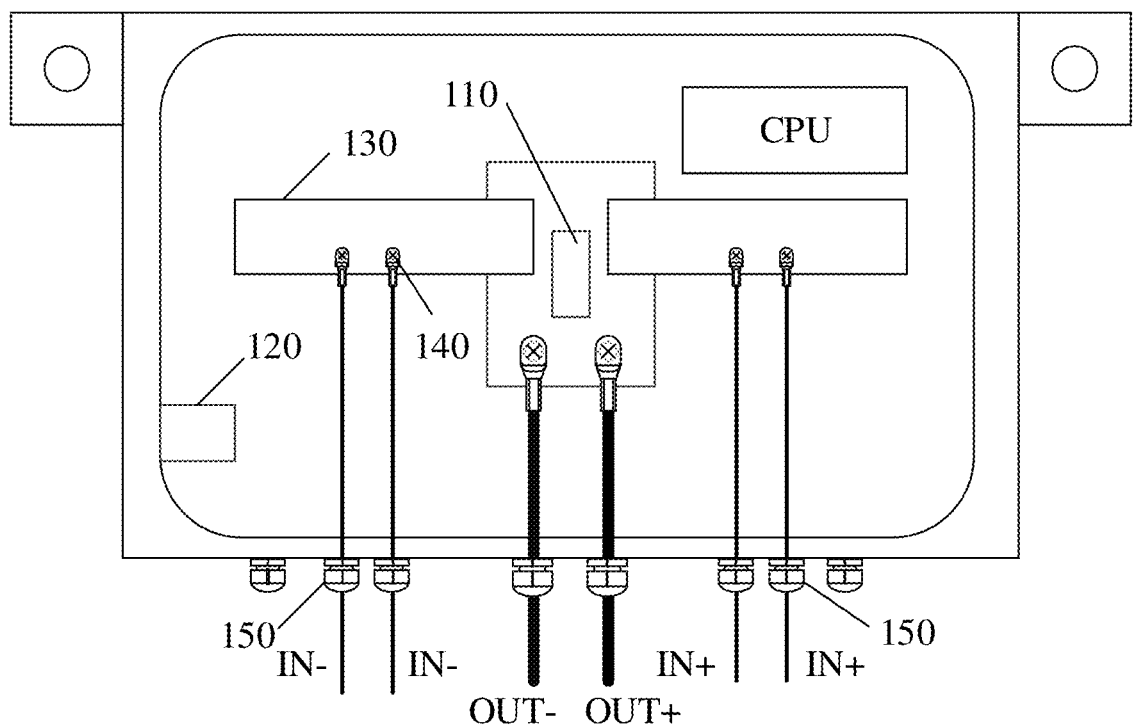
FIG. 10 is a schematic structural diagram illustrating a main combiner box.
Figure 11:
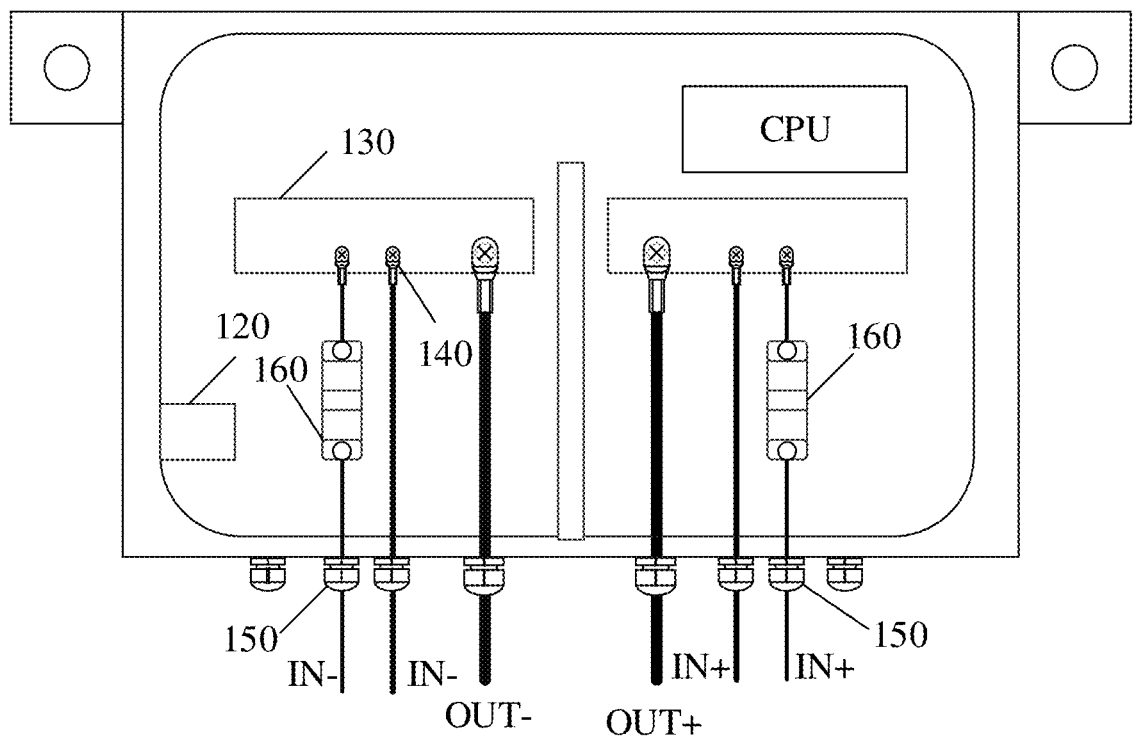
FIG. 11 is a schematic structural diagram illustrating a sub-combiner box.

The main combiner box differs from the sub-combiner box in that the main combiner box is provided with a circuit breaker 110, as shown in FIG. 10. The circuit breaker 110 is configured to connect and disconnect the input and the output of the main combiner box.

The main combiner box, as shown in FIG. 10, is provided with two positive input terminals IN+ and two negative input terminals IN− in pairs and a positive output terminal OUT+ and a negative output terminal OUT− in pairs. The main combiner box is further provided with a lightning arrester 120 in order to protect the bus from damaging effects of lightning. The main combiner box is further provided with a cable substrate 130 and a cable terminal 140 electrically connected to the cable substrate 130. The main combiner box is further provided with a waterproof terminal 150 in order to improve waterproof performance of the main combiner box.

It should be noted that, the main combiner box shown in FIG. 10 may further be provided with other components besides these listed above. Reference can be made to the conventional technology, and thus these components are not listed herein for concision.

The sub-combiner box, as shown in FIG. 11, is provided with two positive input terminals IN+ and two negative input terminals IN− in pairs and a positive output terminal OUT+ and a negative output terminal OUT− in pairs. The sub-combiner box is further provided with two fuses 160, and details are shown in FIG. 11. The sub-combiner box is further provided with a lightning arrester 120 in order to protect the bus from damaging effects of lightning. The sub-combiner box is further provided with a cable substrate 130 and a cable terminal 140 electrically connected to the cable substrate 130. The sub-combiner box is further provided with a waterproof terminal 150 in order to improve waterproof performance of the sub-combiner box.

It should be noted that, the sub-combiner box shown in FIG. 11 may further be provided with other components besides these listed above. Reference can be made to the conventional technology, and thus these components are not listed herein for concision.

In practice, the cable substrate 130 may be symmetrical and in a shape as commonly used currently, as shown in FIGS. 10 and 11, which facilitates production and assembly, thereby reducing costs of money and time spent on production and assembly. The cable terminal 140 is also the cable terminal commonly used currently, thereby reducing occurrence of failure and reducing costs for operation and maintenance.

In an embodiment, the cable substrate 130 is made of copper or aluminum. In another embodiment, the cable substrate 130 is a copper-aluminum transition substrate. Materials from which the cable substrate 130 is made depends on practical application scenarios and thus are not limited herein.

Correspondingly, the cable terminal 140 is made of copper terminal or aluminum. Alternatively, the cable terminal 140 is a copper-aluminum transition terminal. Materials from which the cable terminal 140 is made depends on practical application scenarios and thus are not limited herein.

In practice, if the direct current cable is made of copper, the cable terminal 140 is made of copper and the cable substrate 130 is made of copper. If the direct current cable is made of aluminum, the cable terminal 140 is made of aluminum and the cable substrate 130 is made of aluminum. Alternatively, if the direct current cable is made of aluminum, the cable terminal 140 is the copper-aluminum transition terminal and the cable substrate 130 is the copper-aluminum transition substrate.

Figure 12:
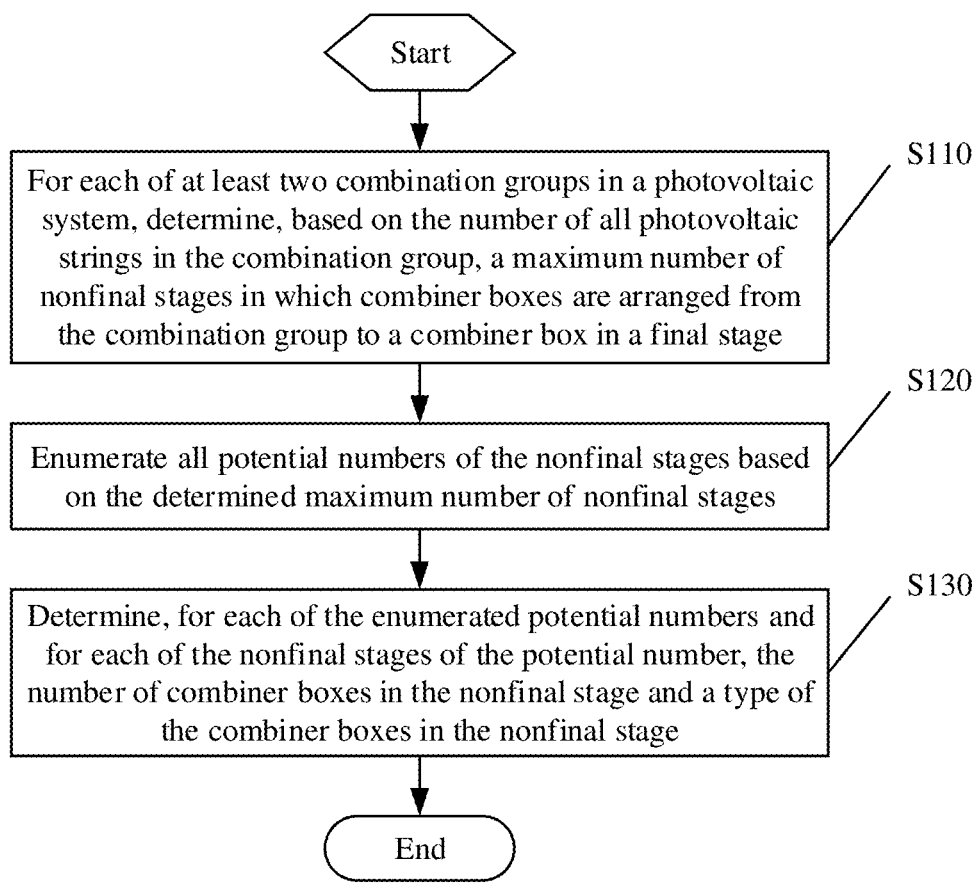
FIGS. 12 and 13 are schematic flow charts illustrating a method for determining a combiner box set for the photovoltaic system according to an embodiment of the present disclosure.

A method for determining a combiner box set for the photovoltaic system according to the above embodiments is provided according to another embodiment of the present disclosure. As shown in FIG. 12, the method includes the following steps S110 to S130.

In step S110, a maximum number of nonfinal stages in which combiner boxes are arranged from a combination group in the photovoltaic system to a combiner box in a final stage is determined based on the number of all photovoltaic strings in the combination group.

For example, the combination group includes 24 photovoltaic strings in total. The combiner box has at least two inputs and one output and 32 is the nth power of 2 that is greater than 24 and closest to 24. Therefore, the maximum number of stages is 5−1=4 stages.

In step S120, potential numbers of the nonfinal stages in which combiner boxes are arranged from the combination group to the combiner box in the final stage are enumerated based on the determined maximum number.

The maximum number of stages in the above example is 4, and therefore the potential numbers of stages may be 1 stage, 2stages, 3stages and 4stages.

In step S130, for each of the potential numbers, for each of the nonfinal stages of this potential number, the number of combiner boxes in the stage and a type of each of the combiner boxes in the stage are determined.

An example in which the combination group includes 24 photovoltaic strings and all the combiner boxes are arranged in two (first and second) stages is described below for illustration.

In a first case, there are 6 combiner boxes in the first stage and 1 combiner box in the second stage, each of the 6 combiner boxes in the first stage has 4 inputs and 1 output. In a second case, there are 4 combiner boxes in the first stage and 1 combiner box in the second stage, each of the 4 combiner boxes in the first stage has 6 inputs and 1 output. In a third case, there are 3 combiner boxes in the first stage and 1 combiner box in the second stage, each of the 3 combiner boxes in the first stage has 8 inputs and 1 output. In these cases, each combiner box in the first stage is a sub-combiner box, and each combiner box in the second stage is a main combiner box.

Figure 13:
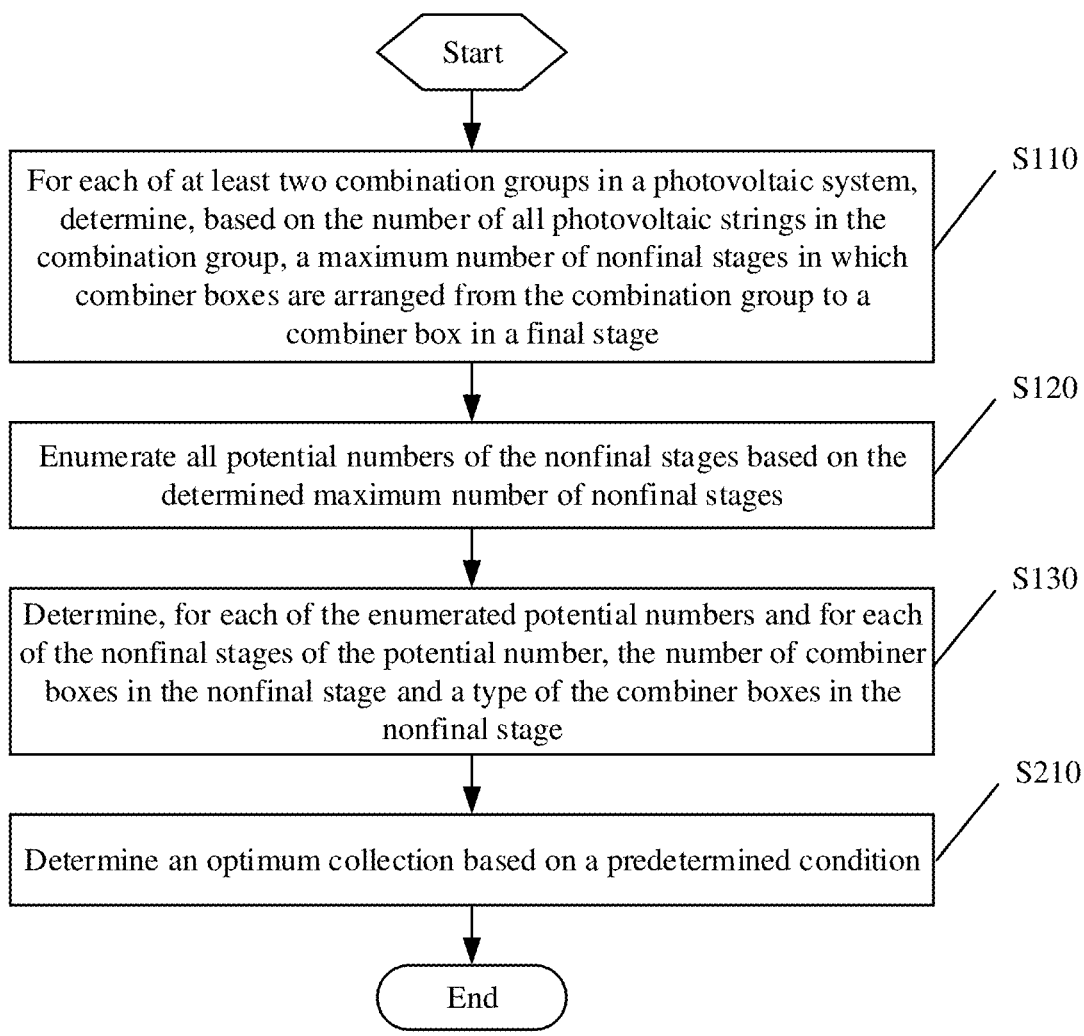

The method for determining a combiner box set for the photovoltaic system according to another embodiment of the present disclosure further includes step S210 after step S130, as shown in FIG. 13.

In step S210, an optimum collection is determined based on a predetermined condition. The collection includes the number of nonfinal stages selected from the potential numbers, the number of the combiner boxes in each of the nonfinal stages, and the type of the combiner boxes in each of the nonfinal stages.

The predetermined condition includes minimum costs of the photovoltaic system. In practice, the predetermined condition further includes at least one of minimum technical requirements, minimum risk of operation and maintenance, minimum construction requirements, and minimum power loss. The predetermined condition depends on practical application scenarios and thus is not limited herein.

Costs of the photovoltaic system in 4 sets are listed in a table below.

| Type of combiner box | Capacity (KW) | Length of cable (m) | Costs of cable (RMB, inclusive of construction) | Number of combiner box | Costs of combiner box (RMB, inclusive of construction) | Reduction in costs per watt (RMB/W) |
|---|---|---|---|---|---|---|
| 24inputs and 1output | 360 | 2010 | 8745 | 1 | 2500 | — |
| 4inputs and 1output | 360 | 550 | 2757 | 6 + 1 | 4780 | 0.0103 |

-continued

| Type of combiner box | Capacity (KW) | Length of cable (m) | Costs of cable (RMB, inclusive of construction) | Number of combiner box | Costs of combiner box (RMB, inclusive of construction) | Reduction in costs per watt (RMB/W) |
|---|---|---|---|---|---|---|
| 6inputs and 1output | 360 | 692 | 3478 | 4 + 1 | 3620 | 0.0115 |
| 8inputs and 1output | 360 | 698 | 3699 | 3 + 1 | 3040 | 0.0125 |

In a case that the predetermined condition includes only the minimum costs of the photovoltaic system, the optimum set is as follows. The number of stages is determined as 1. The number of the combiner boxes in the first stage is 6, and each of the 6 combiner boxes in the first stage has 4 inputs and 1 output. The number of the combiner boxes in the final stage is 1, and the combiner box in the final stage has 6 inputs and 1 output.

It should be noted that the photovoltaic array is variable in arrangement in practice, resulting in variable positions of devices in the photovoltaic array and a variable length of the cable. However, this method is applicable to this case.

Based on the disclosed embodiments described above, the features in embodiments in this specification may be replaced or combined with each other, so that those skilled in the art can implement or use the present disclosure. Merely preferred embodiments of the present disclosure and described above, and the present disclosure is not limited thereto. The skilled in the art may make possible changes and modifications to the technical solution of the present disclosure or modify it into equivalent embodiments based on the method and technical content disclosed above, without departing from the scope of the technical solution of the present disclosure. Therefore, any simple modifications, equivalent changes and amendments made based on the technical essence of the present disclosure without departing from the technical solution of the present disclosure, are fall within the protection scope of the technical solution of the present disclosure.

The invention claimed is:

1. A photovoltaic system, comprising:
a photovoltaic array divided into at least two combination groups;
a photovoltaic converter; and
a combiner box in at least one nonfinal stage and a combiner box in a final stage for each of the at least two combination groups, wherein
a direct current side of the photovoltaic converter is electrically connected to an output terminal of the combiner box in the final stage; and the combiner box in the final stage and the combiner box in the at least one nonfinal stage are configured to combine outputs of photovoltaic strings in the at least two combination groups; and
for each of the combiner box in the at least one nonfinal,
the combiner box in the at least one nonfinal stage is arranged on a supporting member of a photovoltaic string closest to a geometric center of an input end position image, and the input end position image is a geometric image formed by respective positions of devices electrically connected to an input end of the combiner box.

2. The photovoltaic system according to claim 1, wherein the combiner box in the final stage and the combiner box in the at least one nonfinal stage form a combiner box set, wherein in the combiner box set, an input terminal in a first stage is connected to at least two of the photovoltaic strings in the at least two combination groups;
an input terminal in a next stage is connected to at least two output terminals in a stage immediately before the next stage; or the input terminal in the next stage is connected to at least one of the photovoltaic strings in the at least two combination groups and at least one output terminal in a stage immediately before the next stage; and
the output terminal in the final stage is electrically connected to the direct current side of the photovoltaic converter.

3. The photovoltaic system according to claim 1, wherein the number of the combiner box in the at least one nonfinal stage is at least two, and the number of the combiner box in the final stage is at least two, wherein
at least two combiner boxes in the nonfinal stage are electrically cascaded to a same combiner box in a next stage through a common electrical bus; and/or
output terminals of the at least two combiner boxes in the final stage are electrically connected to the photovoltaic converter through a common electrical bus.

4. The photovoltaic system according to claim 3, wherein the at least two combiner boxes are connected to the common electrical bus internally or externally.

5. The photovoltaic system according to claim 3, wherein the common electrical bus has an equal cross-section throughout its length, and a size of the cross-section depends on a maximum current flowing through the common electrical bus.

6. The photovoltaic system according to claim 3, wherein the common electrical bus is divided into segments with cross-sections depending on currents following through the segments, respectively.

7. The photovoltaic system according to claim 1, wherein combiner boxes in the same nonfinal stage are electrically cascaded to a combiner box in a next stage through respective buses; or
output terminals of combiner boxes in the final stage are electrically connected to the direct current side of the photovoltaic converter through respective buses.

8. The photovoltaic system according to claim 1, wherein the combiner box in a first stage among the at least one nonfinal stage has four inputs and one output.

9. The photovoltaic system according to claim 1, wherein
the combiner box in the at least one nonfinal stage is communicatively connected to a combiner box in a next stage, wherein the combiner box in the at least one nonfinal stage is electrically cascaded to the combiner box in the next stage; or
the combiner box in the final stage is communicatively connected to the photovoltaic converter.

10. The photovoltaic system according to claim 9, wherein
at least two combiner boxes communicatively connected to the same combiner box are communicatively connected to each other through a common communication bus; or at least two combiner boxes in the final stage communicatively connected to the photovoltaic converter are communicatively connected to each other through a common communication bus.

11. The photovoltaic system according to claim 1, wherein the combiner box in the final stage is a main combiner box, and the combiner box in the nonfinal stage is a sub-combiner box, wherein the main combiner box comprises a circuit breaker, and the circuit breaker is configured to: connect an input of the main combiner box to an output of the main combiner box; and disconnect the input of the main combiner box from the output of the main combiner box.

12. The photovoltaic system according to claim 1, wherein the photovoltaic converter comprises a photovoltaic inverter; or the photovoltaic converter comprises a photovoltaic inverter and a direct current converter.

13. A method for determining a combiner box set for the photovoltaic system according to claim 1, comprising:

for each of the at least two combination groups, determining, based on the number of all photovoltaic strings in each of the at least two combination groups, a maximum number of nonfinal stages in which combiner boxes are arranged from each of the at least two combination groups to the combiner box in the final stage;

enumerating all potential numbers of the nonfinal stage based on the determined maximum number; and determining, for each of the enumerated potential numbers and for each of the nonfinal stages of the potential number, the number of combiner boxes in the nonfinal stage and a type of the combiner boxes in the nonfinal stage.

14. The method according to claim 13, further comprising:

determining an optimum collection based on a predetermined condition after the determining, for each of the enumerated potential numbers and for each of the nonfinal stages of the potential number, the number of combiner boxes and a type of the combiner boxes in the nonfinal stage, wherein the predetermined condition comprises minimum costs of the photovoltaic system, and the collection comprises the number of the nonfinal stages selected from the potential numbers, the number of the combiner boxes and the type of the combiner boxes in each of the nonfinal stages.

* * * * *